(12) United States Patent
Cote (10) Patent No.: US 11,628,888 B2
(45) Date of Patent: Apr. 18, 2023

(54) ENCLOSED VOLUME SANDWICH HOOD

(71) Applicant: GM GLOBAL TECHNOLOGY OPERATIONS LLC, Detroit, MI (US)

(72) Inventor: Benjamin Cote, Orchard Lake, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 281 days.

(21) Appl. No.: 17/061,680

(22) Filed: Oct. 2, 2020

(65) Prior Publication Data

US 2022/0105989 A1 Apr. 7, 2022

(51) Int. Cl.
*B62D 25/10* (2006.01)
*B62D 25/12* (2006.01)
*B60R 21/34* (2011.01)

(52) U.S. Cl.
CPC .......... *B62D 25/105* (2013.01); *B62D 25/12* (2013.01); *B60R 2021/343* (2013.01)

(58) Field of Classification Search
CPC  B62D 25/105; B62D 25/12; B60R 2021/343; B60R 5/02
See application file for complete search history.

(56) References Cited

U.S. PATENT DOCUMENTS

| | | | |
|---|---|---|---|
| 7,690,720 B2 | 4/2010 | Wang et al. | |
| 7,735,908 B2* | 6/2010 | Wang | B62D 25/105 |
| | | | 52/783.17 |
| 9,033,407 B2* | 5/2015 | Ikeda | B60R 21/34 |
| | | | 296/193.11 |
| 9,527,450 B1* | 12/2016 | Bellis | B62D 25/082 |
| 9,783,236 B1* | 10/2017 | Rivera | B62D 25/105 |
| 11,214,185 B2* | 1/2022 | Qiu | B60N 3/104 |
| 2009/0065277 A1* | 3/2009 | Wang | B62D 25/105 |
| | | | 180/69.2 |
| 2010/0019540 A1* | 1/2010 | Fujimoto | B60R 21/34 |
| | | | 296/193.11 |
| 2013/0106142 A1* | 5/2013 | Yonezawa | B60R 21/34 |
| | | | 296/193.11 |
| 2013/0181484 A1* | 7/2013 | Grattan | B62D 25/105 |
| | | | 296/193.11 |
| 2015/0028624 A1* | 1/2015 | Wisniewski | B62D 25/105 |
| | | | 296/187.03 |

(Continued)

FOREIGN PATENT DOCUMENTS

| CN | 106828613 A | * | 6/2017 |
| JP | 2003226264 A | * | 8/2003 |

(Continued)

*Primary Examiner* — James A Shriver, II
*Assistant Examiner* — Ian Bryce Shelton
(74) *Attorney, Agent, or Firm* — Cantor Colburn LLP (57) ABSTRACT

A hood assembly for a vehicle comprises an outer panel, an inner panel disposed inwardly of the outer panel and defining a lower, sealing surface, a crush volume defined between the outer panel and the inner panel; and a bridging member disposed within the crush volume and configured to extend supportively between the outer panel and the inner panel. The bridging member comprises a support surface that is in supportive contact with the outer panel and support members that extend from the support surface toward the inner panel for structural support of the hood assembly.

17 Claims, 5 Drawing Sheets

(56) References Cited

U.S. PATENT DOCUMENTS

| | | | | |
|---|---|---|---|---|
| 2016/0096505 A1* | 4/2016 | Ikeda | ............... | B62D 29/005 |
| | | | | 296/193.11 |
| 2017/0274937 A1* | 9/2017 | Hammer | ............... | B60R 21/34 |
| 2017/0282978 A1* | 10/2017 | Yoshida | ............... | B62D 25/105 |
| 2017/0341601 A1* | 11/2017 | Zhou | ............... | B60R 13/0838 |
| 2020/0101854 A1* | 4/2020 | Nakanishi | ............... | B60K 15/05 |
| 2020/0262482 A1* | 8/2020 | Makowski | ............... | B62D 25/12 |
| 2020/0307502 A1* | 10/2020 | Mankame | ............... | F03G 7/06115 |
| 2020/0317135 A1* | 10/2020 | Liu | ............... | B62D 25/087 |
| 2021/0039558 A1* | 2/2021 | Rucker | ............... | E05D 7/12 |
| 2021/0114525 A1* | 4/2021 | Mazzarella | ............... | B32B 5/245 |
| 2021/0237652 A1* | 8/2021 | Mazzarella | ............... | B60R 13/011 |
| 2022/0371519 A1* | 11/2022 | Weber | ............... | B60R 21/34 |

FOREIGN PATENT DOCUMENTS

| | | | | |
|---|---|---|---|---|
| JP | 2017185902 A | * | 10/2017 | |
| WO | WO-2015118268 A1 | * | 8/2015 | ........... B62D 25/105 |

\* cited by examiner

ENCLOSED VOLUME SANDWICH HOOD

INTRODUCTION

This disclosure is related to automotive vehicle panels and, more particularly, to a vehicle panel assembly having an outer panel an inner panel and a supporting structure.

Automotive vehicle bodies are typically constructed using stamped metal or molded composite panels that combine strength and stiffness with a smooth, paintable exterior surface and an inner surface providing support. Referring, for the purpose of discussion, to vehicle hood assemblies (also referred to as engine compartment hoods, bonnets and frunk or trunk closure panels), panel stiffness is often satisfied via the combination of a stamped or formed outer panel coupled with a structural inner panel. The inner panel may comprise a structural web that is designed to provide adequate support for the more decorative outer panel. The inner panel may include a series of hat-section reinforcements that are fixed to the underside of the outer panel thereby connecting the two panels into a panel assembly. The use of a rigid structural web to support the outer panel may provide disadvantages when designing the panel assembly to meet pedestrian impact standards. Such standards may require a substantial displacement of the outer panel, in the case of a vehicle/pedestrian impact, to minimize bodily injury. Additionally, in vehicles having front storage volumes (ex. rear or mid-engine vehicles and electric vehicles) it is necessary that the panel assembly prevent the ingress of moisture, dirt and dust. This requires an inner panel that can present a surface that is amenable to an aggressive sealing function.

SUMMARY

In one exemplary embodiment a hood assembly for a vehicle comprises an outer panel having an upper, outer facing surface and a lower, inner facing surface, an inner panel disposed inwardly of the outer panel having an upper, inner facing surface and a lower, sealing surface. A crush volume is defined between the outer panel and the inner panel and a bridging member is disposed within the crush volume and is configured to extend supportively between the lower, inner facing surface of the outer panel and the upper, inner facing surface of the inner panel. The bridging member comprises a support surface that is in supportive contact with one of the outer panel and the inner panel and a support member that extends from the support surface toward the other panel to engage the other panel for structural support of the hood assembly.

In addition to one or more of the features described herein, the hood assembly outer panel and inner panel are configured to be joined substantially about perimeter edges to define the crush volume therebetween.

In addition to one or more of the features described herein, the hood assembly inner panel is configured to establish an effective seal with an upper edge of a bucket of a storage volume.

In addition to one or more of the features described herein, the support surface of the bridging member comprises a first, central support surface and a second, outer support surface extending substantially circumferentially thereabout and defining a gap therebetween.

In addition to one or more of the features described herein, the support member spans the gap defined by the first, central support surface and the second, outer support surface and contacts the facing surface of the other panel to maintain the support surfaces of the bridging member in supportive contact with one of the outer panel and the inner panel of the hood assembly.

In addition to one or more of the features described herein, additional support members extend from the second, outer support surface towards outer perimeter edges of the hood assembly.

In addition to one or more of the features described herein, the support surface of the bridging member comprises a first, central support surface and second, outer support surface extending laterally therefrom and defining a gap therebetween.

In addition to one or more of the features described herein, the bridging member is be constructed of stamped steel or aluminum or, a formed composite material.

In addition to one or more of the features described herein, a thickness of the bridging member may vary from 0.5 mm-1.8 mm for a steel bridging member, 0.7 mm-2.0 mm for an aluminum bridging member and 0.6 mm-2.6 mm for a carbon fiber bridging member.

In another exemplary embodiment, a vehicle body comprises an underlying vehicle structure, a front portion mounted to the vehicle structure, a bulkhead spaced longitudinally from the front portion and a front volume defined longitudinally between the front portion and the bulkhead and housing a storage volume therein. The storage volume comprises a bucket having a bottom and upwardly extending sides with upper edges and a sealing member disposed along the upper edges. A hood assembly for closing the front volume comprises an outer panel having an upper, outer facing surface and a lower, inner facing surface and an inner panel disposed inwardly of the outer panel having an upper, inner facing surface and a lower, sealing surface configured to engage the sealing member. A crush volume is defined between the outer panel and the inner panel and a bridging member is disposed within the crush volume and is configured to extend supportively between the lower, inner facing surface of the outer panel and the upper, inner facing surface of the inner panel. The bridging member has a support surface in supportive contact with the lower, inner facing surface of outer panel and a support member that extends from the support surface toward the upper, inner facing surface of the inner panel to engage the upper, inner facing surface for structural support of the hood assembly.

In addition to one of more of the features described herein, the inner panel of the hood assembly has a cross-section that includes a sealing region configured to engage the upper edges of the bucket and, particularly, the sealing member, to effectively seal the storage volume against an intrusion of environmental contaminants such as water, dirt or dust.

In addition to one or more of the features described herein, the outer panel and the inner panel of the hood assembly are configured to be joined substantially about perimeter edges to define the crush volume therebetween.

In addition to one or more of the features described herein, the support surface of the bridging member comprises a first, central support surface and a second, outer support surface extending substantially circumferentially thereabout and defining a gap therebetween.

In addition to one or more of the features described herein, the support member of the bridging member spans the gap defined by the first, central support surface and the second, outer support surface to contact the upper, inner facing surface of the inner panel to maintain the support surfaces in supportive contact with the outer panel of the hood assembly.

In addition to one or more of the features described herein, additional support members extend from the second, outer support surface towards outer perimeter edges of the hood assembly.

In addition to one or more of the features described herein, the support surface of the bridging member comprises a first, central support surface and second, outer support surface extending laterally therefrom and defining a gap therebetween.

In addition to one or more of the features described herein, the bridging member is constructed of stamped steel or aluminum or, a formed composite material.

In addition to one or more of the features described herein, a thickness of the bridging member may vary from 0.5 mm-1.8 mm for a steel bridging member, 0.7 mm-2.0 mm for an aluminum bridging member and 0.6 mm-2.6 mm for a carbon fiber bridging member.

In yet another exemplary embodiment, a hood assembly for a vehicle comprises an outer panel and an inner panel disposed inwardly of the outer panel and defining a lower, sealing surface. A crush volume is defined between the outer panel and the inner panel and a bridging member is disposed within the crush volume and is configured to extend supportively between the outer panel and the inner panel. The bridging member comprises a support surface that is in supportive contact with one of the outer and the inner panel and a support member extends from the support surface toward the other panel for structural support of the hood assembly.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application of uses. Throughout the drawings, corresponding reference numerals indicate like or corresponding parts and features.

Figure 1:
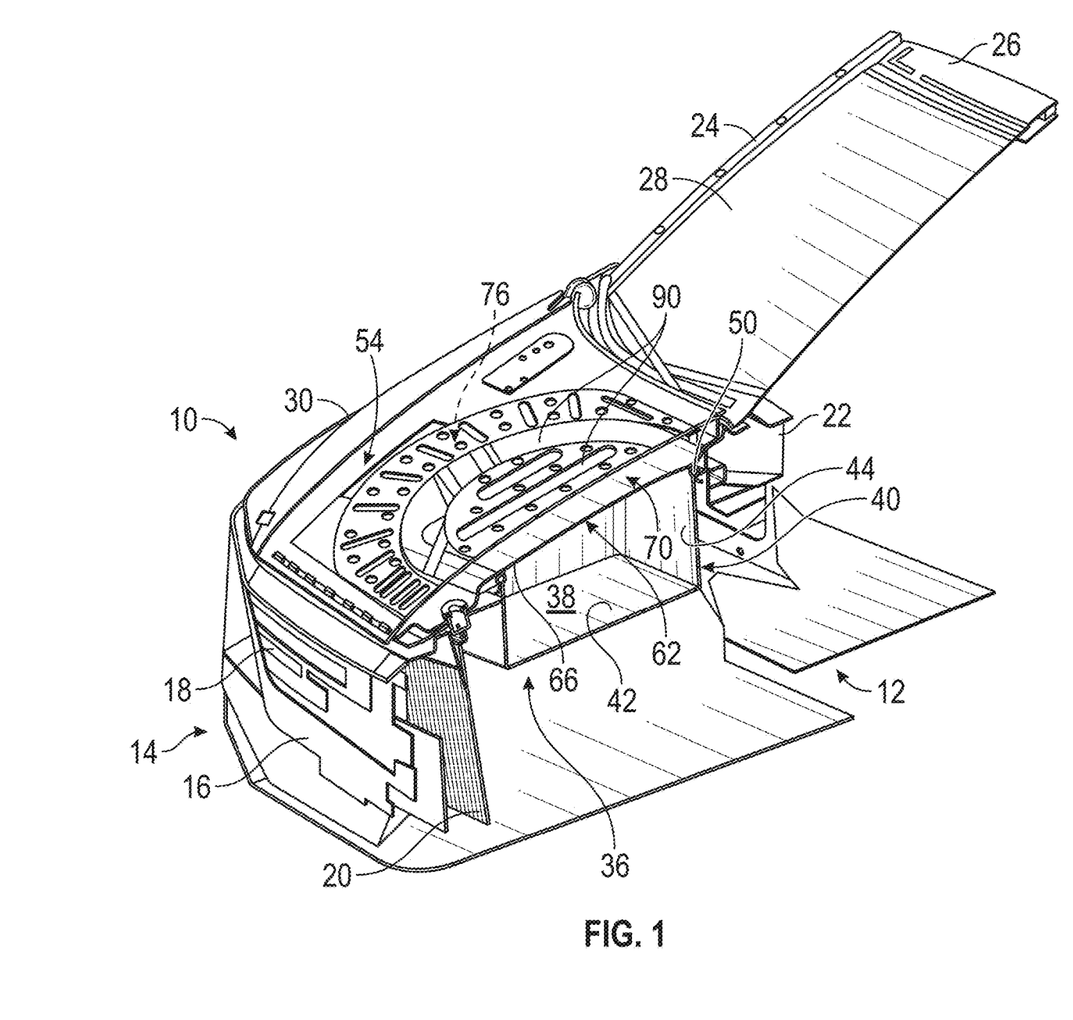
FIG. 1 is a perspective, longitudinally sectioned view of a front portion of a vehicle according to an embodiment of the disclosure.

Referring now to FIG. 1, a front portion of a vehicle body 10 is illustrated in longitudinal section. The vehicle body 10 includes an underlying vehicle structure or frame assembly 12. A front portion 14 is mounted to the vehicle structure 12 and may include a bumper assembly 16 and a grill assembly 18. One or more heat exchangers 20 may be disposed behind the grill assembly 18 and uses ambient air passing through the grill assembly to remove vehicle generated thermal energy therefrom. A bulkhead 22 is spaced longitudinally from the front portion 14 and defines the rearward limit of the front portion of the vehicle body 10. A-pillars 24 extend upwardly and rearwardly from the bulkhead 22 to support a roof panel 26 and vehicle windshield 28. Fender panels 30 extend longitudinally from the front portion 14 to the base of the A-pillars 24 along the outer (i.e. latitudinal) edges of the front portion.

Figure 2:
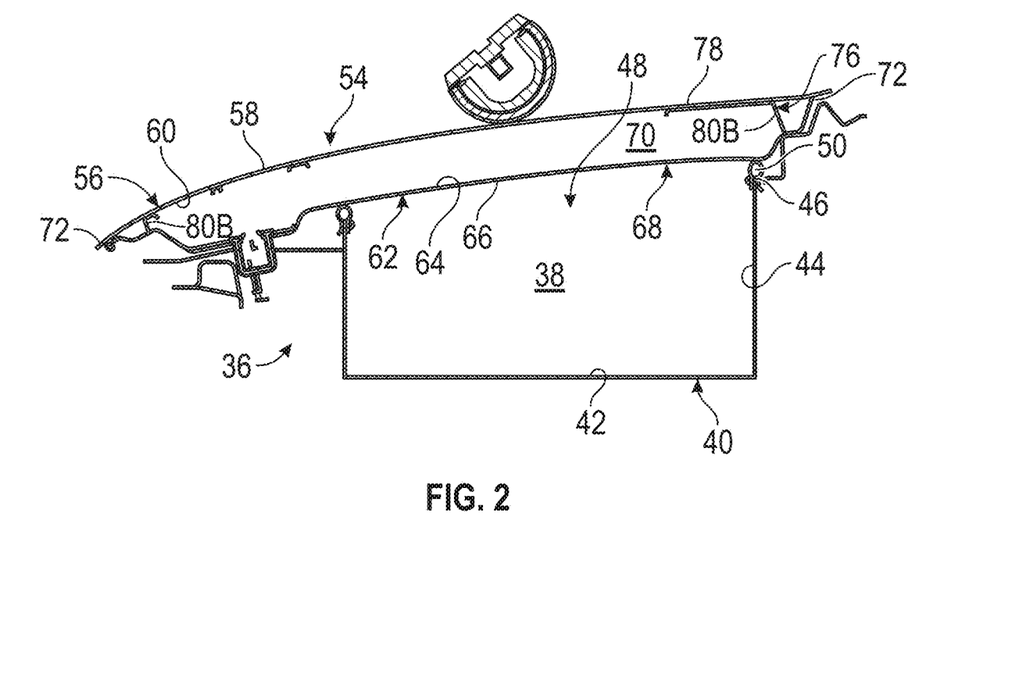
FIG. 2 is a schematic, sectional view of part of the front portion illustrated in FIG. 1.

Referring to FIG. 2, with continuing reference to FIG. 1, in the illustrated vehicle body 10, a front volume 36 is defined longitudinally between the front portion 14 and the bulkhead 22 and latitudinally between the opposing fenders 30. Applications for the front volume 36 will vary depending upon the particular vehicle configuration and, in the embodiment illustrated, is utilized to house a storage volume or frunk assembly 38. The frunk assembly 38 comprises a bucket 40 having a bottom 42 and upwardly extending sides 44. Upper edges 46, of the sides 44, define an opening 48 for the frunk assembly 38 and, additionally, define a sealing region that may include a sealing member or sealing gasket 50 disposed thereon.

Figure 5:
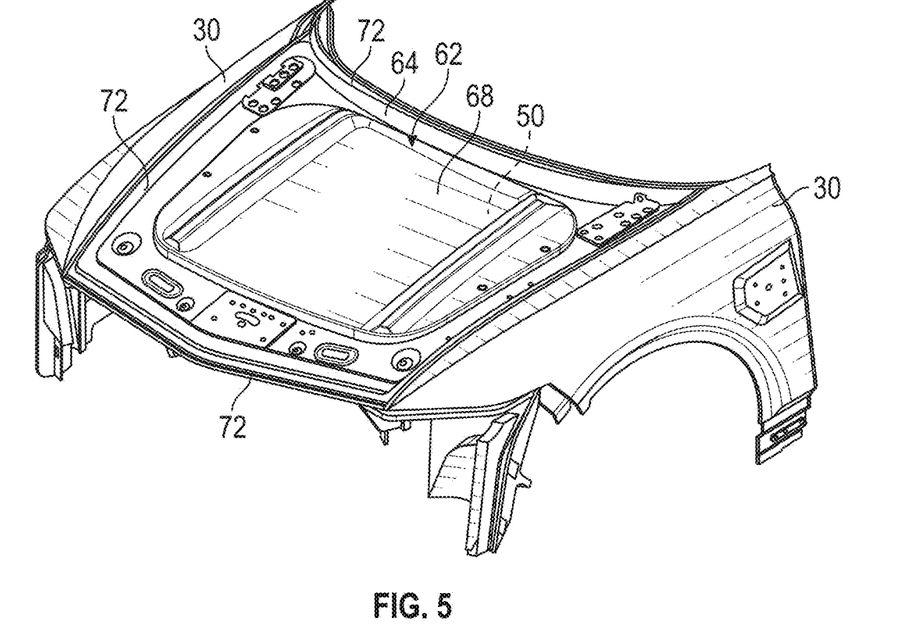
FIG. 5 is the view of FIG. 4, with parts removed.
Figure 6:
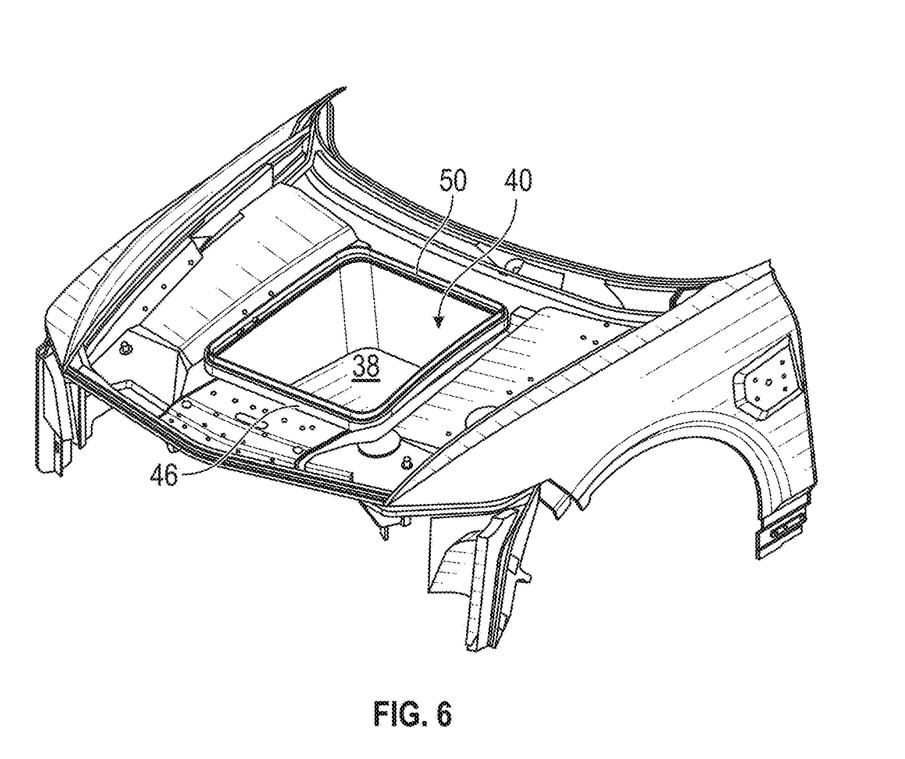
FIG. 6 is the view of FIG. 5 with parts removed.

Disposed above the frunk assembly 38 and configured to close the front volume 36 is a panel assembly or hood assembly 54. The hood assembly 54 extends laterally between the fender panels 30 and longitudinally between the front portion 14 and the base of the windshield 28. In an embodiment, and additionally referring to FIGS. 3, 4, 5 and 6, the hood assembly 54 comprises an outer panel 56 having an upper, outer facing surface 58 and a lower, inner facing surface 60. The outer panel 56 may be constructed of stamped steel or aluminum or a formed composite material such as fiberglass or carbon fiber for instance. The upper, outer facing surface 58 of the hood assembly 54 is the painted, aesthetic surface viewed from the vehicle exterior. Disposed inwardly of the outer panel 56 is an inner panel 62 having an upper, inner facing surface 64 and a lower, sealing surface 66. The inner panel 62 may be constructed of stamped steel or aluminum or a formed composite material such as fiberglass or carbon fiber for instance. Additionally, the inner panel includes a simplified cross-section that includes a sealing region 68, FIGS. 5 and 6, that is configured to engage the upper edges 46 of the bucket 40 and, particularly, the sealing member or gasket 50, to effectively seal the storage volume 38 against the intrusion of environmental contaminants such as water, dirt or dust.

Figure 2A:
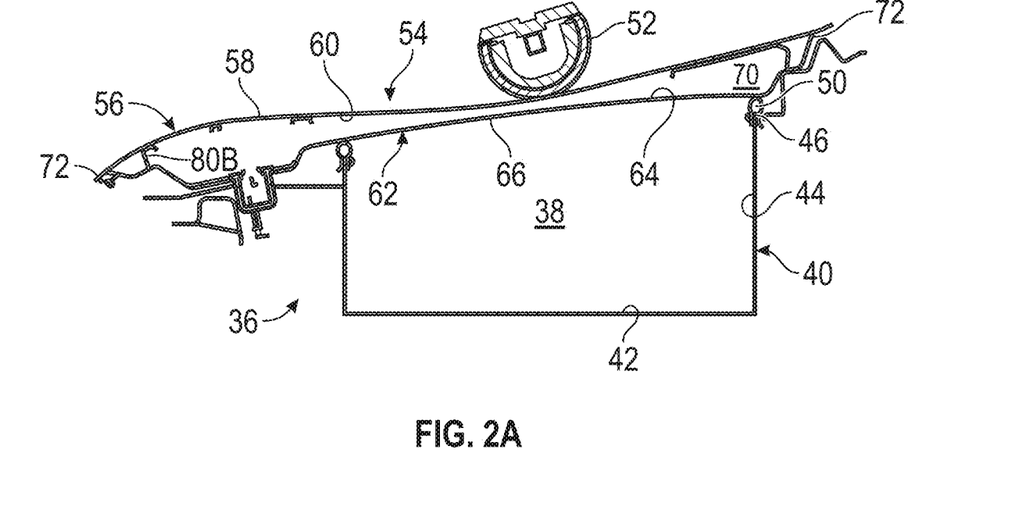
FIG. 2A is the view of FIG. 2 under compression.
Figure 3:
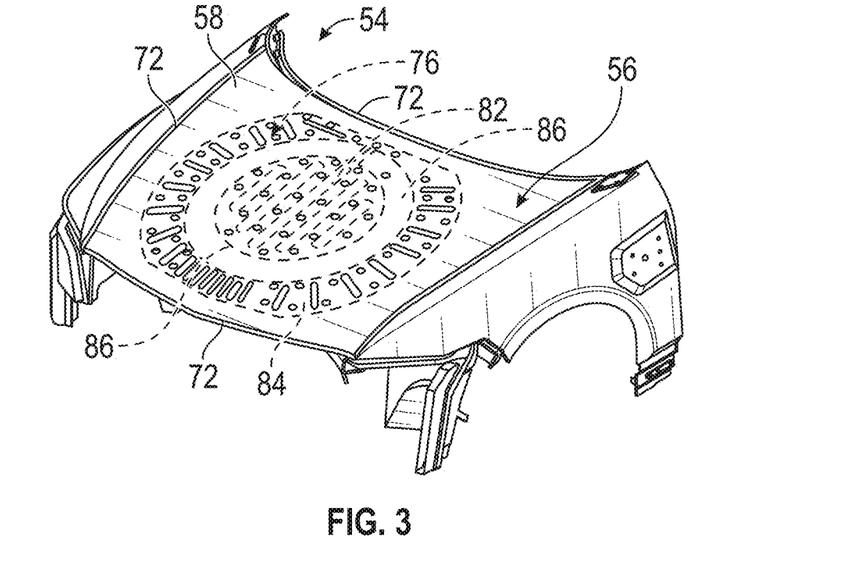
FIG. 3 is a simplified view of the front portion of FIG. 1 with parts shown in phantom.

As illustrated in FIGS. 2 and 2A, the outer panel 56 and the inner panel 62 are configured to be joined substantially about their perimeter edges 72 to define a crush volume 70 therebetween (i.e. defined between the lower, inner facing surface 60 and the upper, inner facing surface 64). The crush volume 70 provides a separation between substantial portions of the outer panel 56 and the inner panel 62 allowing the inner panel to be configured to establish an effective seal with the upper edges 46 of the bucket 40, as described, and also to allow displacement of the outer panel 56 in cases of impact with pedestrians or other objects 52 that may come in contact with the front of the vehicle, FIG. 2A.

Referring now to FIGS. 3, 4, 5 and 6, with continuing reference to FIGS. 1 and 2, disposed within the crush volume 70 and configured to extend supportively between the lower, inner facing surface 60 of the outer panel 56 and the upper, inner facing surface 64 of the inner panel 62 is a bridging member 76. The bridging member may be constructed of any suitable material such as stamped steel or aluminum or, a formed composite material. Bridging member 76 includes a support surface 78 (one or more supporting surfaces is also contemplated herein), that is in supportive contact with the lower, inner facing surface 60 of outer panel 56. The support surface 78 may be welded, bonded or otherwise fixed to the outer panel 56. In the alternative, the outer support surface may rest in contact with the lower inner facing surface of the outer panel 56 without such fixing.

In addition, the bridging member 76 includes support members 80 that extend from the support surface 78 toward the upper, inner facing surface 64 of the inner panel 62. The support members 80 engage the upper, inner facing surface and may be welded, bonded or otherwise fixed thereto for structural support to the hood assembly. In the alternative, the support members 80 may rest in contact with the upper, inner facing surface of the inner panel 62 without such fixing. Various embodiments of the bridging member 76 are contemplated; the configurations driven by the size and shape of the panel assembly or hood 54.

In the embodiment illustrated in FIGS. 3-6, the support surface 78 of the bridging member 76 comprises a first, central support surface 82 and a second, outer support surface 84 extending substantially circumferentially thereabout. Support members 80 span the gaps 86 defined by the support surfaces 82 and 84, while contacting the upper, inner facing surface 64 of the inner panel 62. The configuration of the support members 80 maintains the support surface 78 (first, central support surface 82 and second, outer support surface 84) in supportive contact with the outer panel 56 of the hood assembly 54 to provide support, therefore. Additional support members 80B may extend from the second, outer support surface 84 towards the outer perimeter edges 72 of the hood assembly 54. The additional support members 80B provide perimeter support for the panels across the entire expanse of the hood assembly 54.

Figure 7:
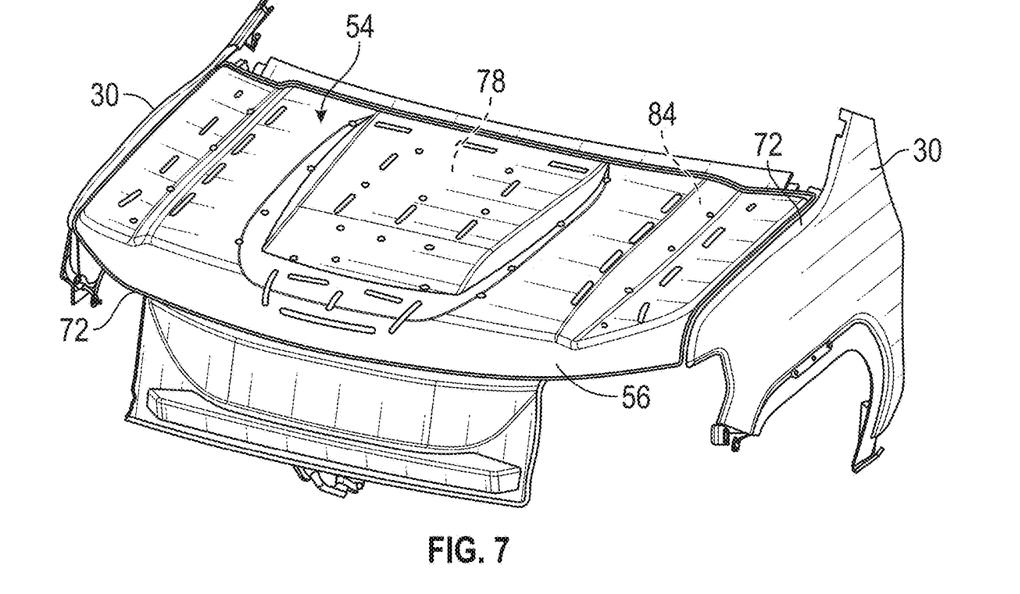
FIG. 7 is a perspective view of another embodiment of a front portion of a vehicle according to another embodiment of the disclosure.
Figure 8:
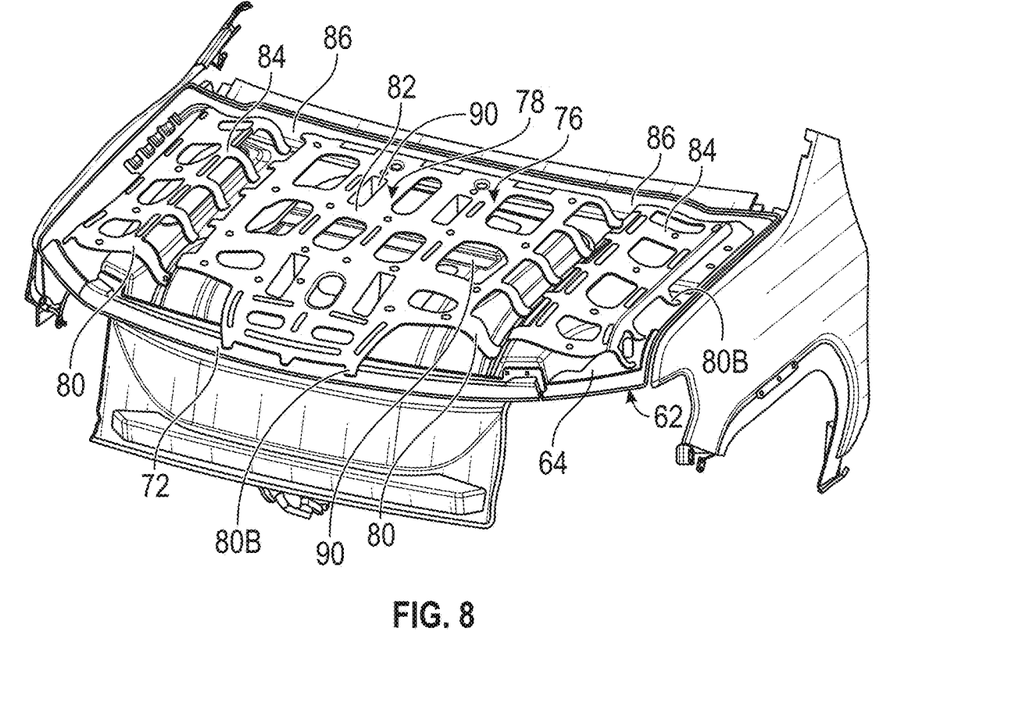
FIG. 8 is the view of FIG. 7 with parts removed.

In another exemplary embodiment illustrated in FIGS. 7 and 8, the support surface 78 of the bridging member 76 comprises a first, central support surface 82 and second, outer support surfaces 84 extending laterally therefrom. Support members 80 span the gaps 86 defined by the support surfaces 82 and 84, while contacting the upper, inner facing surface 64 of the inner panel 62. The configuration of the support members 80 maintains the support surface 78 (first, central support surface 82 and second, outer support surface 84) in supportive contact with the outer panel 56 of the hood assembly 54 to provide support, therefore. Additional support members 80B may extend from the second, outer support surfaces 84 towards the outer perimeter edges 72 of the outer panel 56 and the inner panel 62. The additional support members 80B provide perimeter support for the panels across the entire expanse of the panel assembly or hood 54.

Figure 4:
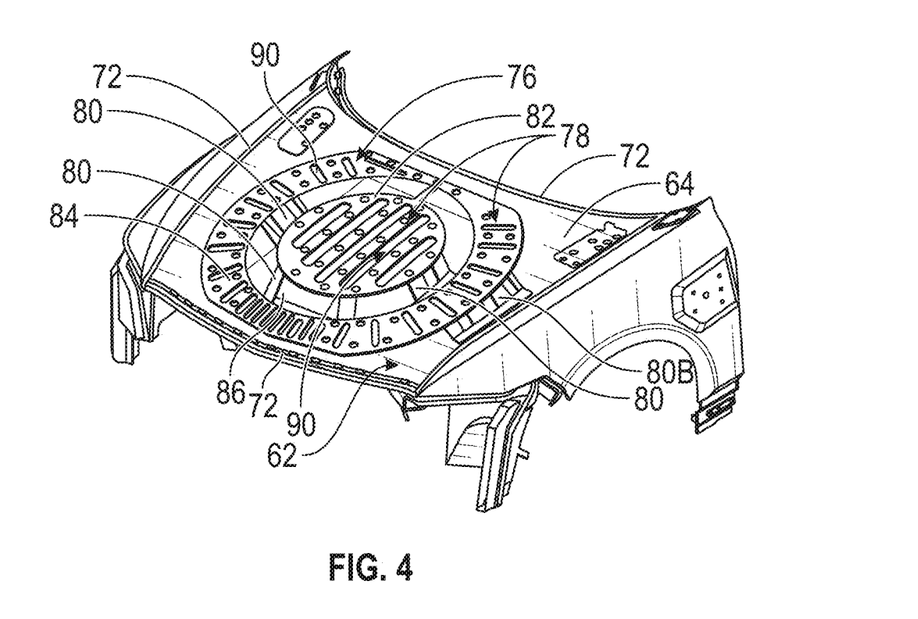
FIG. 4 is the view of FIG. 3, with parts removed.

As illustrated in FIG. 4, the support members 80 and 80B may vary in width and thickness allowing designers to customize the supporting and crush performance of the hood assembly 54. It is contemplated that the support members may vary in width from fully solid about the perimeter of the first, central support surface 82 to a width of 10 mm. The gage thickness of the bridging member 76 may also be varied to further customize the supporting and crush performance of the panel assembly or hood 54. It is further contemplated that the thickness may vary from 0.5 mm-1.8 mm for steel bridging members, 0.7 mm-2.0 mm for aluminum bridging members and 0.6 mm-2.6 mm for carbon fiber bridging members, for instance.

Referring to the Figures, the support surface 78 of the bridging member 76 may also include a series of cutouts 90 of varying size and shape. The cutouts 90 may be cut or stamped in the bridging member to fine tune the crush performance of the bridging member 76 and, as a result, the panel assembly or hood 54.

The present disclosure allows the inner panel 62 of a panel assembly or hood 54 to be simplified to provide a primary sealing function to a storage volume or frunk assembly 38 without compromising the structural and crush performance of the outer panel 56. The intermediate bridging member spans the crush volume 70 of the panel assembly to support the outer panel 56 while providing design flexibility for meeting panel crush requirements. While the present disclosure describes the bridging member as extending in a particular direction between the inner panel 62 and the outer panel 56, it is contemplated that the bridging member may also extend in other directions such that the support surface(s) 78 are located adjacent to the upper, inner facing surface 64 of the inner panel with the support members 80 extending towards the lower, inner facing surface 60 of the outer panel 56.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure is not limited to the particular embodiments disclosed but will include all embodiments falling within the scope thereof

What is claimed is:

1. A hood assembly for a vehicle comprising:
    an outer panel having an upper, outer facing surface, a lower, inner facing surface, and an outer perimeter edge;
    an inner panel disposed inwardly of the outer panel having an upper, inner facing surface, a lower, sealing surface, and a perimeter edge portion, the outer panel being joined to the inner panel along the perimeter edge and the perimeter edge portion;
    a crush volume defined between the outer panel and the inner panel; and
    a bridging member arranged supportively between the outer panel and the inner panel and extending about the perimeter edge and the perimeter edge portion the crush volume being defined inwardly of the bridging member, the bridging member comprising:
    a support surface that is in supportive contact with one of the outer panel and the inner panel; and
    a support member that extends from the support surface toward the other panel to engage the other panel for structural support of the hood assembly.

2. The hood assembly of claim 1, wherein the inner panel is configured to establish an effective seal with an upper edge of a bucket of a storage volume.

3. The hood assembly of claim 1, wherein, the support surface of the bridging member comprises a first, central support surface and a second, outer support surface extending substantially circumferentially thereabout and defining a gap therebetween.

4. The hood assembly of claim 3, wherein the support member spans the gap defined by the first, central support surface and the second, outer support surface and contact the facing surface of the other panel to maintain the support surfaces of the bridging member in supportive contact with one of the outer panel and the inner panel of the hood assembly.

5. The hood assembly of claim 4, wherein additional support members extend from the second, outer support surface towards outer perimeter edges of the hood assembly.

6. The hood assembly of claim 1, wherein the support surface of the bridging member comprises a first, central support surface and second, outer support surface extending laterally therefrom and defining gaps therebetween.

7. The hood assembly of claim 1, wherein the bridging member is constructed of stamped steel or aluminum or, a formed composite material.

8. The hood assembly of claim 7, wherein a thickness of the bridging member may vary from 0.5 mm-1.8 mm for steel bridging members, 0.7 mm-2.0 mm for aluminum bridging members and 0.6 mm-2.6 mm for carbon fiber bridging members, for instance.

9. A vehicle body comprising
an underlying vehicle structure;
a front portion mounted to the vehicle structure;
a bulkhead spaced longitudinally from the front portion;
a front volume defined longitudinally between the front portion and the bulkhead and housing a storage volume therein, the storage volume comprising a bucket having a bottom and upwardly extending sides with upper edges and a sealing member disposed along the upper edges; and
a hood assembly for closing the front volume comprising:
an outer panel having an upper, outer facing surface, a lower, inner facing surface, and an outer perimeter edge;
an inner panel disposed inwardly of the outer panel having an upper, inner facing surface, a lower, sealing surface configured to engage the sealing member, and a perimeter edge portion, the outer panel being joined to the inner panel along the perimeter edge and the perimeter edge portion;
a crush volume defined between the outer panel and the inner panel; and
a bridging member arranged between the outer panel and the inner panel and extending about the perimeter edge and the perimeter edge portion the crush volume being defined inwardly of the bridging member, the bridging member having a support surface in supportive contact with the lower, inner facing surface of outer panel and a support member that extends from the support surface towards the upper, inner facing surface of the inner panel to engage the upper, inner facing surface for structural support of the hood assembly.

10. The vehicle body of claim 9, wherein, the inner panel of the hood assembly has a cross-section that includes a sealing region configured to engage the upper edges of the bucket and, particularly, the sealing member, to effectively seal the storage volume against an intrusion of environmental contaminants such as water, dirt or dust.

11. The vehicle body of claim 9, wherein, the support surface of the bridging member comprises a first, central support surface and a second, outer support surface extending substantially circumferentially thereabout and defining a gap therebetween.

12. The vehicle body of claim 11, wherein the support member of the bridging member spans the gap defined by the first, central support surface and the second, outer support surface to contact the upper, inner facing surface of the inner panel to maintain the support surfaces in supportive contact with the outer panel of the hood assembly.

13. The vehicle body of claim 12, wherein additional support members extend from the second, outer support surface towards outer perimeter edges of the hood assembly.

14. The vehicle body of claim 9, wherein the support surface of the bridging member comprises a first, central support surface and a second, outer support surface extending laterally therefrom and defining a gap therebetween.

15. The vehicle body of claim 9, wherein the bridging member is constructed of stamped steel or aluminum or, a formed composite material.

16. The vehicle body of claim 15, wherein a thickness of the bridging member may vary from 0.5 mm-1.8 mm for a steel bridging members, 0.7 mm-2.0 mm for an aluminum bridging member and 0.6 mm-2.6 mm for a carbon fiber bridging member, for instance.

17. A hood assembly for a vehicle comprises:
an outer panel;
an inner panel disposed inwardly of the outer panel and defining a lower, sealing surface;
a crush volume defined between the outer panel and the inner panel; and
a bridging member disposed within the crush volume and configured to extend supportively between the outer panel and the inner panel, the bridging member comprising a support surface that is in supportive contact with one of the outer and the inner panel and support members that extend about a portion of the upper panel and the lower panel from the support surface toward the other of the outer panel and the inner panel for structural support of the hood assembly, wherein the crush volume is defined inwardly of the support members.

* * * * *